(12) United States Patent
Kimberlin et al.

(10) Patent No.: US 9,962,663 B2
(45) Date of Patent: May 8, 2018

(54) QUICK DISCONNECT PUMP

(71) Applicant: Standex International Corporation, Salem, NH (US)

(72) Inventors: Robert R. Kimberlin, Murfreesboro, TN (US); Brian Waters, Mount Juliet, TN (US)

(73) Assignee: Standex International Corporation, Salem, NH (US)

( * ) Notice: Subject to any disclaimer, the term of this patent is extended or adjusted under 35 U.S.C. 154(b) by 93 days.

(21) Appl. No.: 15/232,887

(22) Filed: Aug. 10, 2016

(65) Prior Publication Data
US 2018/0043317 A1    Feb. 15, 2018

(51) Int. Cl.
| | | |
|---|---|---|
| *B01F 3/04* | (2006.01) | |
| *F04C 2/344* | (2006.01) | |
| *F04C 13/00* | (2006.01) | |
| *F04C 15/00* | (2006.01) | |
| *B01F 15/02* | (2006.01) | |
| *F04B 15/02* | (2006.01) | |

(52) U.S. Cl.
CPC ...... *B01F 3/04808* (2013.01); *B01F 3/04099* (2013.01); *B01F 3/04787* (2013.01); *B01F 15/0243* (2013.01); *F04B 15/02* (2013.01); *F04C 2/344* (2013.01); *F04C 13/00* (2013.01); *F04C 15/0003* (2013.01); *B01F 2003/049* (2013.01)

(58) Field of Classification Search
CPC ........ F04B 15/02; B01F 3/04; B01F 3/04099; B01F 3/04787
USPC .................................................. 261/77, 78
See application file for complete search history.

(56) References Cited

U.S. PATENT DOCUMENTS

| | | | |
|---|---|---|---|
| 3,512,808 A | 5/1970 | Graham | |
| 4,116,476 A | 9/1978 | Porter et al. | |
| 4,171,559 A | 10/1979 | Vyse et al. | |
| 5,305,923 A | 4/1994 | Kirschner et al. | |
| 5,476,367 A | 12/1995 | Zimmermann et al. | |
| 5,571,000 A | 11/1996 | Zimmermann et al. | |
| 6,000,916 A | 12/1999 | Martin et al. | |
| 6,237,810 B1 | 5/2001 | Credle, Jr. | |
| 6,698,629 B2 | 3/2004 | Taylor-McCune | |
| 7,878,766 B2 | 2/2011 | Meza et al. | |
| 7,997,448 B1 | 8/2011 | Leyva | |
| 9,637,283 B2 * | 5/2017 | Maguire | ................ B65D 47/24 |
| 2005/0012330 A1 | 1/2005 | Schmidt | |
| 2005/0254970 A1 | 11/2005 | Mayer et al. | |

(Continued)

*Primary Examiner* — Robert A Hopkins
(74) *Attorney, Agent, or Firm* — Luedeka Neely Group, P.C.

(57) ABSTRACT

A quick disconnect pump assembly is disclosed. The pump assembly includes a housing with inlet and outlet ports, an elongate slot, and a retainer channel. A sliding lock moves within the slot between a locked position and an unlocked position. The sliding lock includes inlet and outlet port openings and a sliding lock retainer opening. The inlet and outlet port openings each engage and retain a removable fitting when the sliding lock is in the locked position, but do not engage or retain the removable fitting when the sliding lock is in the unlocked position. The pump assembly also includes a sliding lock retainer which passes through the sliding lock retainer opening to prevent removal of the sliding lock from the elongate slot. A fluid pump and a beverage dispenser utilizing the pump assembly are also disclosed.

18 Claims, 9 Drawing Sheets

(56) References Cited

U.S. PATENT DOCUMENTS

2013/0333767 A1 12/2013 Schmidt
2014/0372233 A1 12/2014 Knecht et al.
2015/0137516 A1 5/2015 Pangburn et al.

* cited by examiner

QUICK DISCONNECT PUMP

FIELD

This disclosure relates to the field of fluid pump. More particularly, this disclosure relates to a pump for a beverage dispenser having an improved mechanism for rapid, tool-less connection and disconnection of the pump to and from the beverage dispenser.

BACKGROUND

Post-mix beverage dispensers combine carbonated water with a concentrated beverage syrup to provide a final beverage for dispensing and consumption. The carbonated water is in turn supplied by mixing carbon dioxide gas with water in a carbonation tank, thereby dissolving carbon dioxide in the water. The original, non-carbonated water must be pumped into the carbonation tank at a substantial pressure in order to mix with the pressurized carbon dioxide gas.

The equipment for producing the carbonated water is generally located on-site at the location of ultimate beverage vendor. Periodically the pump and/or other equipment must be removed from service for maintenance and then reinstalled, or in some instances be replaced. Currently, the removal and installation of such pumps generally requires the services of a trained technician. The task generally cannot be accomplished by the end user. However, the beverage vendor rarely has appropriately trained technicians available on staff; instead, a technician with appropriate training and equipment must be called in to service the pumps. This leads to extra delays and costs for maintenance.

Accordingly, what is desired is an improved carbonation pump for a beverage dispenser, with an improved mechanism for rapid, tool-less connection and disconnection of the pump to and from the beverage dispenser carbonation system.

SUMMARY

The above and other needs are met a quick connect and disconnect beverage pump made in accordance with the present disclosure.

In a first aspect, the present disclosure provides a quick disconnect pump assembly. In one embodiment, the quick disconnect pump assembly includes a pump housing having an inlet port passage and an outlet port passage, an elongate slot for receiving a sliding lock member, and a retainer channel disposed between the inlet port passage and an outlet port passage. The pump assembly also includes a sliding lock member which is received within the elongate slot and movable within the slot between a locked position and an unlocked position. This sliding lock member has an inlet port opening, an outlet port opening, and a sliding lock retainer opening formed in the lock member. The inlet port opening and the outlet port opening each have a first, narrower opening portion which engages and retains a removable fitting when the sliding lock member is in the locked position. The inlet port opening and the outlet port opening each also have second, wider opening portion which does not engage or retain the removable fitting when the sliding lock member is in the unlocked position. In addition, the pump assembly also includes a sliding lock retainer which is disposed within the retainer channel and passes through the sliding lock retainer opening to prevent removal of the sliding lock member from the elongate slot.

In certain embodiments according to the present disclosure, the sliding lock retainer preferably includes a spring disposed within the retainer channel, a retainer base disposed adjacent the spring within the retainer channel and biased upward by the spring, and a retainer button which passes through the sliding lock retainer opening and is attached to the retainer base. Moreover, in certain preferred embodiments, the sliding lock retainer opening preferably has a first, wider opening portion which engages the sliding lock retainer base when the sliding lock member is in the locked position and a second, narrower opening which engages and sliding lock retainer button when the sliding lock member is in the unlocked position.

In certain embodiments according to the present disclosure, the inlet port passage preferably has a first cross-sectional area and the outlet port passage has a second cross-sectional area which is different from the first cross-sectional area. Further, in some embodiments according to the present disclosure, the inlet port passage preferably has a first cross-sectional diameter and the outlet port passage has a second cross-sectional diameter which is different from the first cross-sectional diameter.

In certain preferred embodiments according to the present disclosure, the sliding lock member also includes at least one handle portion.

In a second aspect, the present disclosure provides a quick disconnect fluid pump. In one embodiment, the quick disconnect fluid pump includes a pump housing having an internal pumping chamber, an inlet port passage in flow communication with the pumping chamber, an outlet port passage in flow communication with the pumping chamber, an elongate slot for receiving a sliding lock member, and a retainer channel disposed between the inlet port passage and an outlet port passage. The fluid pump also includes a pumping mechanism at least partially disposed within the pumping chamber and capable of receiving a fluid through the inlet port passage into the pumping chamber at a first pressure and discharging the fluid from the pumping chamber through the outlet port passage at a second pressure which is greater than the first pressure.

The fluid pump includes a sliding lock member which received within the elongate slot and movable within the slot between a locked position and an unlocked position. This sliding lock member has an inlet port opening, an outlet port opening, and a sliding lock retainer opening. The inlet port opening and the outlet port opening each have a first, narrower opening portion which engages and retains a removable fitting when the sliding lock member is in the locked position. The inlet port opening and the outlet port opening each also have second, wider opening portion which does not engage or retain the removable fitting when the sliding lock member is in the unlocked position.

In addition, the fluid pump also includes a sliding lock retainer which is disposed within the retainer channel and passes through the sliding lock retainer opening to prevent removal of the sliding lock member from the elongate slot.

In a third aspect, the present disclosure provides a water carbonation system. In one embodiment, the water carbonation system includes a source of compressed carbon dioxide gas; a source of non-carbonated water in flow communication with a first removable pump fitting; and a carbonation mixing tank. This mixing tank is in flow communication with the source of compressed carbon dioxide gas and in flow communication with a second removable pump fitting. Carbon dioxide gas is mixed with, and dissolved into, the water in the mixing tank to provide carbonated water.

The water carbonation system also includes a quick disconnect fluid pump for pumping water into the carbonation mixing tank. This fluid pump in turn includes a pump housing having an internal pumping chamber, an inlet port passage in flow communication with the pumping chamber, an outlet port passage in flow communication with the pumping chamber, an elongate slot for receiving a sliding lock member, and a retainer channel disposed between the inlet port passage and an outlet port passage. The fluid pump also includes a pumping mechanism at least partially disposed within the pumping chamber and capable of receiving a fluid through the inlet port passage into the pumping chamber at a first pressure and discharging the fluid from the pumping chamber through the outlet port passage at a second pressure which is greater than the first pressure.

The fluid pump includes a sliding lock member which received within the elongate slot and movable within the slot between a locked position and an unlocked position. This sliding lock member has an inlet port opening, an outlet port opening, and a sliding lock retainer opening. The inlet port opening has a first, narrower opening portion which engages and retains the first removable pump fitting when the sliding lock member is in the locked position and a second, wider opening portion which does not engage or retain the first removable pump fitting when the sliding lock member is in the unlocked position. Similarly, the outlet port opening has a first, narrower opening portion which engages and retains the second removable pump fitting when the sliding lock member is in the locked position and a second, wider opening portion which does not engage or retain the second removable pump fitting when the sliding lock member is in the unlocked position.

In addition, the fluid pump also includes a sliding lock retainer which is disposed within the retainer channel and passes through the sliding lock retainer opening to prevent removal of the sliding lock member from the elongate slot.

In yet another aspect, the present disclosure provides a post-mix beverage dispenser. In one embodiment, the post-mix beverage dispenser includes a water carbonation system as described above; a source of beverage syrup; and a beverage mixing and dispensing nozzle in flow communication with the water carbonation system and in flow communication with the source of beverage syrup.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIG. 3A-5A are perspective views illustrating sequential steps of a method for the quick disconnecting of a pump assembly in accordance with the present disclosure;

FIG. 3B-5B are cross-sectional views illustrating sequential steps of a method for the quick disconnecting of a pump assembly in accordance with the present disclosure.

DETAILED DESCRIPTION

The present disclosure relates to a pump assembly, and a related fluid pump, which is adapted for quick, and preferably tool-less, connection and disconnection to fluid transfer lines. The pump is particularly suited for pumping water into a carbonator for a post-mix beverage dispenser.

Figure 1:
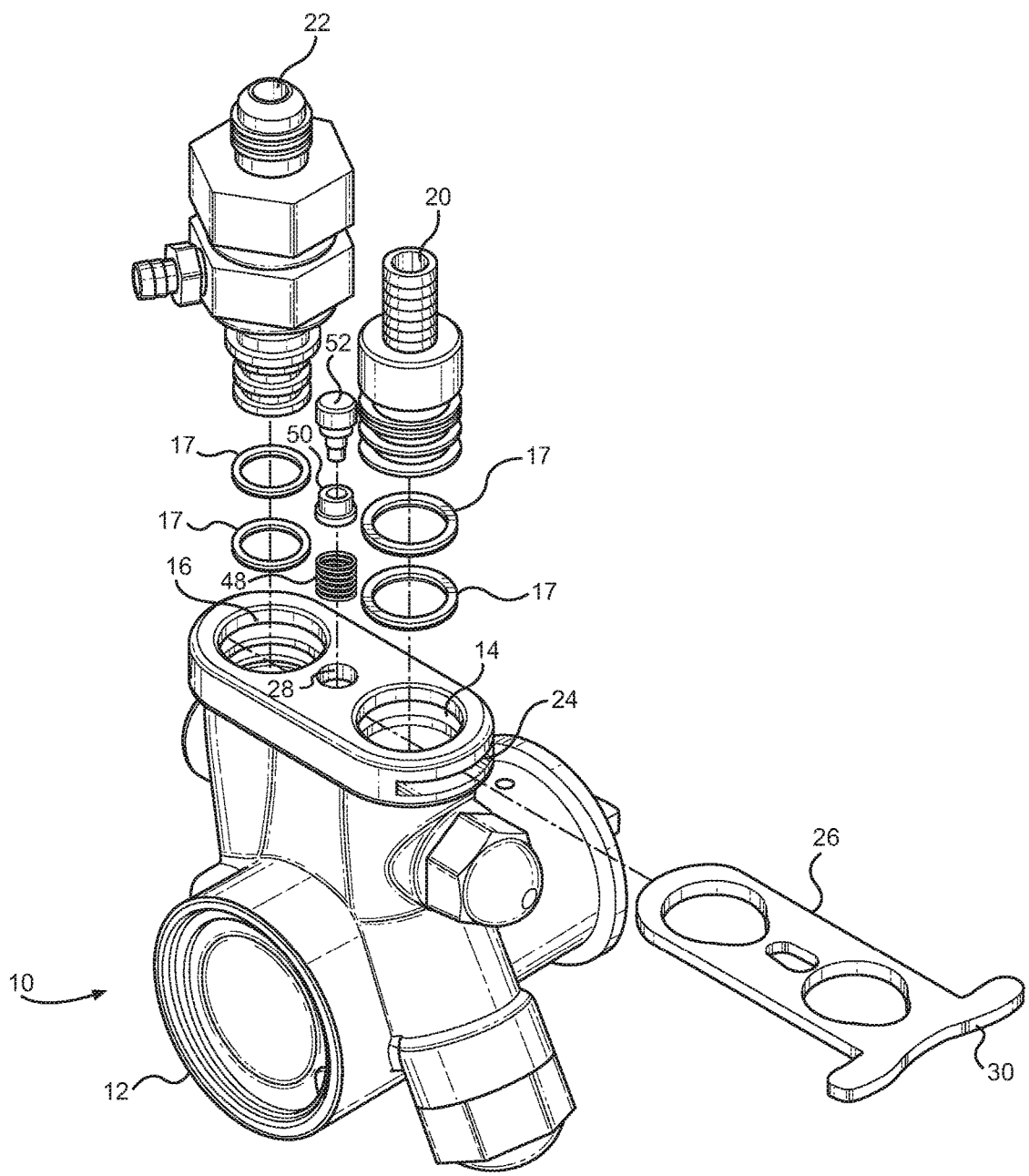
FIG. 1 is a perspective exploded view of a pump assembly made in accordance with the present disclosure.

As shown in FIG. 1, a quick disconnect pump assembly 10 according to the present disclosure includes a pump housing 12, which may be machined from brass, stainless steel, or another metal or alloy. Alternatively, the pump housing 12 may be molded from a polymeric material, preferably a polymeric material embedded with a fiber reinforcement material, such as carbon fiber or fiberglass filaments.

The pump housing 12 includes an inlet port passage 14 and an outlet port passage 16, both of which are in fluid communication with an internal pumping chamber 18 disposed within the pump housing 12. The overall geometry (i.e., the size and shape) of the inlet port and outlet port passages 14, 16 different from one another. Thus, the inlet port passage 14 preferably has a first cross-sectional area and the outlet port passage 16 has a second cross-sectional area which is different from the first cross-sectional area. Moreover, the inlet port passage 14 preferably has a first cross-sectional diameter and the outlet port passage 16 has a second cross-sectional diameter which is different from the first cross-sectional diameter.

As explained in more detail below, the size and shape of the inlet port passage 14 corresponds to that of a first removable fitting 20 which is received in the inlet port passage 14. The size and shape of the outlet port passage 16 corresponds to that of a second removable fitting 22 which is received in the outlet port passage 16. The first removable fitting 20 can only be inserted into the inlet port passage 14 and not the outlet port passage 16. Meanwhile, the second removable fitting 22 can only be inserted into the outlet port passage 16 and not the inlet port passage 14. A set of o-rings 17 may also be included in both the inlet port passage 14 and the outlet port passage 16 to insure watertight sealing with the first and second removable fittings 20, 22.

In general, a pumping mechanism is at least partially disposed within this pumping chamber 18. The pumping mechanism, which is described in more detail below, is capable of receiving a fluid through the inlet port passage 14 into the pumping chamber 18 at a first pressure and discharging the fluid from the pumping chamber 18 through the outlet port passage 16 at a second pressure which is greater than the first pressure. The pump assembly 10, together with the pumping mechanism, provide the overall fluid pump 11.

The pump housing 12 also includes a thin elongate slot 24, for receiving a sliding lock member 26, and a retainer channel 28. The elongate slot 24 is formed in a portion of the pump housing 12 adjacent the inlet and outlet port passages 14, 16 such that both the inlet and outlet port passages 14, 16 pass through the interior of the slot 24. The retainer channel 28 is generally disposed between the inlet port passage 14 and the outlet port passage 16.

Figure 2:
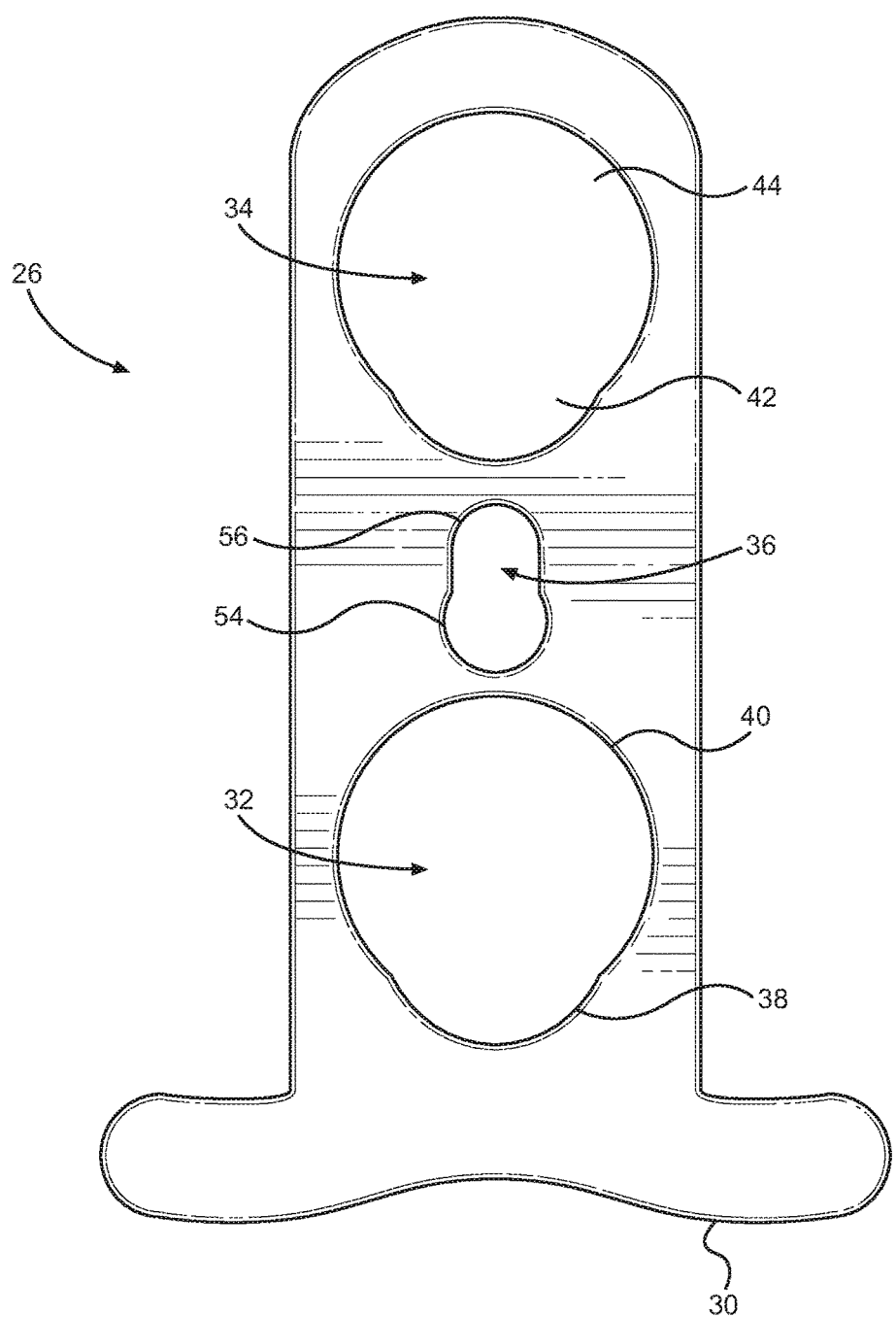
FIG. 2 is a plan view of a sliding lock member for use in accordance with the present disclosure.

The pump assembly 10 also includes a sliding lock member 26 which is received within the elongate slot 24 and movable within the slot 24 between a locked position and an unlocked position. As shown in FIG. 2, the sliding lock member 26 is a generally flat and elongate bar, formed from a metal such as steel or a reinforced polymer material. In general, the sliding lock member 26 also includes at least one handle portion 30 to facilitate manual movement between the locked and unlocked positions.

The sliding lock member 26 includes at least three openings cut into the lock member—an inlet port opening 32, an outlet port opening 34, and a sliding lock retainer opening 36. The inlet port opening 32 has a first opening portion 38 and a second opening portion 40. The shape of the first opening portion 38 is different from that of the second opening portion 40. The first portion 38 is a narrower opening portion which is shaped and sized to engage and retain a first, removable inlet fitting 20 when the sliding lock member 26 is in the locked position. The second portion 40 is a wider opening portion which does not engage or retain the first removable fitting 20 when the sliding lock member 26 is in the unlocked position. Instead, the first removable fitting 20 may pass freely in and out of the second portion 40 of the inlet port opening 32, when the lock member 26 is in the unlocked position.

Similar to the inlet port opening 32, the outlet port opening 34 also opening has a first opening portion 42 and a second opening portion 44 with the shape of the first opening portion 42 being different from that of the second opening portion 44. The first portion 42 of the outlet port opening 34 is a narrower portion which is shaped and sized to engage and retain a second, removable outlet fitting 22 when the sliding lock member 26 is in the locked position. The second portion 44 is also a wider opening portion which does not engage or retain the second removable fitting 22 when the sliding lock member 26 is in the unlocked position, but allows the second removable fitting 22 to pass freely in and out of the second portion 44 of the outlet port opening 34, when the lock member 26 is in the unlocked position.

In addition, the pump assembly 10 also includes a sliding lock retainer 46. This retainer is disposed within the retainer channel 28 and generally includes a spring 48, a retainer base 50, and a retainer button 52. The spring 48 is positioned within the bottom of the retainer channel 28, while the retainer base 50 is disposed adjacent the spring 48 within the retainer channel 28 and is biased upward by the spring 48. The retainer button 52 is then positioned above, and attached to, the retainer base 50. For instance, in some instances, the retainer button 52 may include a set of threads and be screwed into the retainer base 50. More preferably, however, the retainer button 52 may include a barb which snaps through an opening formed in the retainer base 50. Once the retainer button 52 is snapped into place in this manner, the retainer button 52 cannot be removed from the retainer base 50.

The sliding lock retainer 46 passes through the sliding lock retainer opening 36 to prevent removal of the sliding lock member 26 from the elongate slot 24. More particularly, the sliding lock retainer opening 36 preferably has a first, wider opening portion 54 which engages the sliding lock retainer base 50 when the sliding lock member 26 is in the locked position and a second, narrower opening portion 56 which engages the sliding lock retainer button 52 when the sliding lock member 26 in the unlocked position.

As noted above, the pump assembly 10 is generally part of an overall fluid pump 11, including a pumping mechanism and a suitable motor. The pumping mechanism receives a fluid, such as water, through the inlet port passage 14 into the pumping chamber 18 at a first pressure and discharges the fluid from the pumping chamber 18 through the outlet port passage 16 at a second pressure which is greater than the first pressure. For instance, the fluid pump 11 may be provided as a positive displacement rotary vane pump, and the pumping mechanism may include a pump liner disposed within the pumping chamber 18, together with other moving and static pump parts, such as a rear cap, endplate, o-rings, bearings, seals, rotor, vanes, alignment pins, snap rings, shaft, pressure relief valve, port inserts, washers, inlet strainer, and the like.

Figure 6:
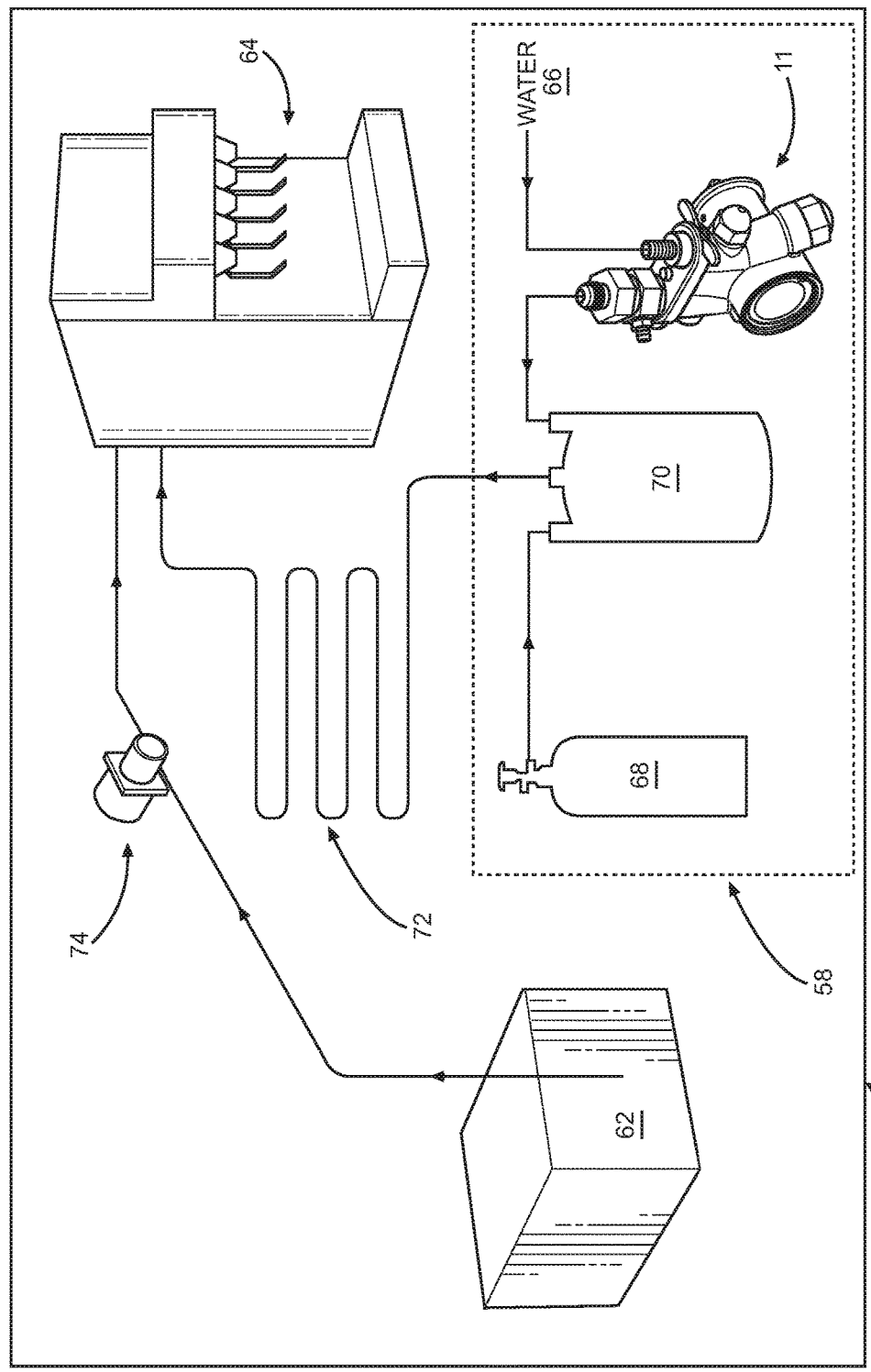
FIG. 6 is schematic diagram illustrating a water carbonation system and a beverage dispenser in accordance with the present disclosure.

In a further aspect, the present disclosure also relates to a water carbonation system 58 and to a post-mix beverage dispenser 60, both of which utilizes a quick disconnect pump assembly 10 as described above. As shown in FIG. 6, the post-mix beverage dispenser 60 includes a water carbonation system 58. The beverage dispenser 60 also includes a source of concentrated beverage syrup, such as a bag-in-box syrup container 62. In addition, the beverage dispenser 60 also includes a beverage mixing and dispensing nozzle 64. This nozzle 64 is connected to, and in flow communication with, the water carbonation system 58. The carbonated water may also flow through a chiller 72 before reaching the dispensing nozzle 64. The dispensing nozzle 64 is also connected to, and in flow communication with, the bag-in-box or other beverage syrup container 62. A syrup pump 74 may be used to move the syrup from the syrup container 62 to the dispensing nozzle 64.

The water carbonation system 58 for the post-mix beverage dispenser 60 utilizes a quick disconnect fluid pump 11 as described above. In addition, the water carbonation system 58 also includes a source of non-carbonated water (such as a municipal water supply line 66) in flow communication with a first removable fitting 20. This first removable fitting 20 is connected to the inlet port passage 16 of the quick disconnect fluid pump 11. The outlet port passage 16 of the pump is connected to a second removable fitting 22 which is in flow communication with a carbonation mixing tank 70. This mixing tank 70 is also in flow communication with a source of carbon dioxide gas such as a compressed gas cylinder 68. Water is pumped into the mixing tank 70 at an elevated pressure by the quick disconnect fluid pump 11. Carbon dioxide gas is then mixed with, and dissolved into, the water in the mixing tank 70 to provide carbonated water.

In use, both the water supply line and/or the water discharge line may be rapidly connected or disconnected to or from the pump assembly 10 in order to facilitate maintenance on the fluid pump 11 itself, the carbonation tank, and/or the beverage dispensing nozzle 64. Such connections and disconnections are preferably carried out without the need for any tools.

The process for quick disconnection of the pump assembly 10 from the water supply and discharge lines is illustrated in FIGS. 3A-5A, with further illustration also being shown in cross-sectional FIGS. 3B-5B.

Figure 3A:
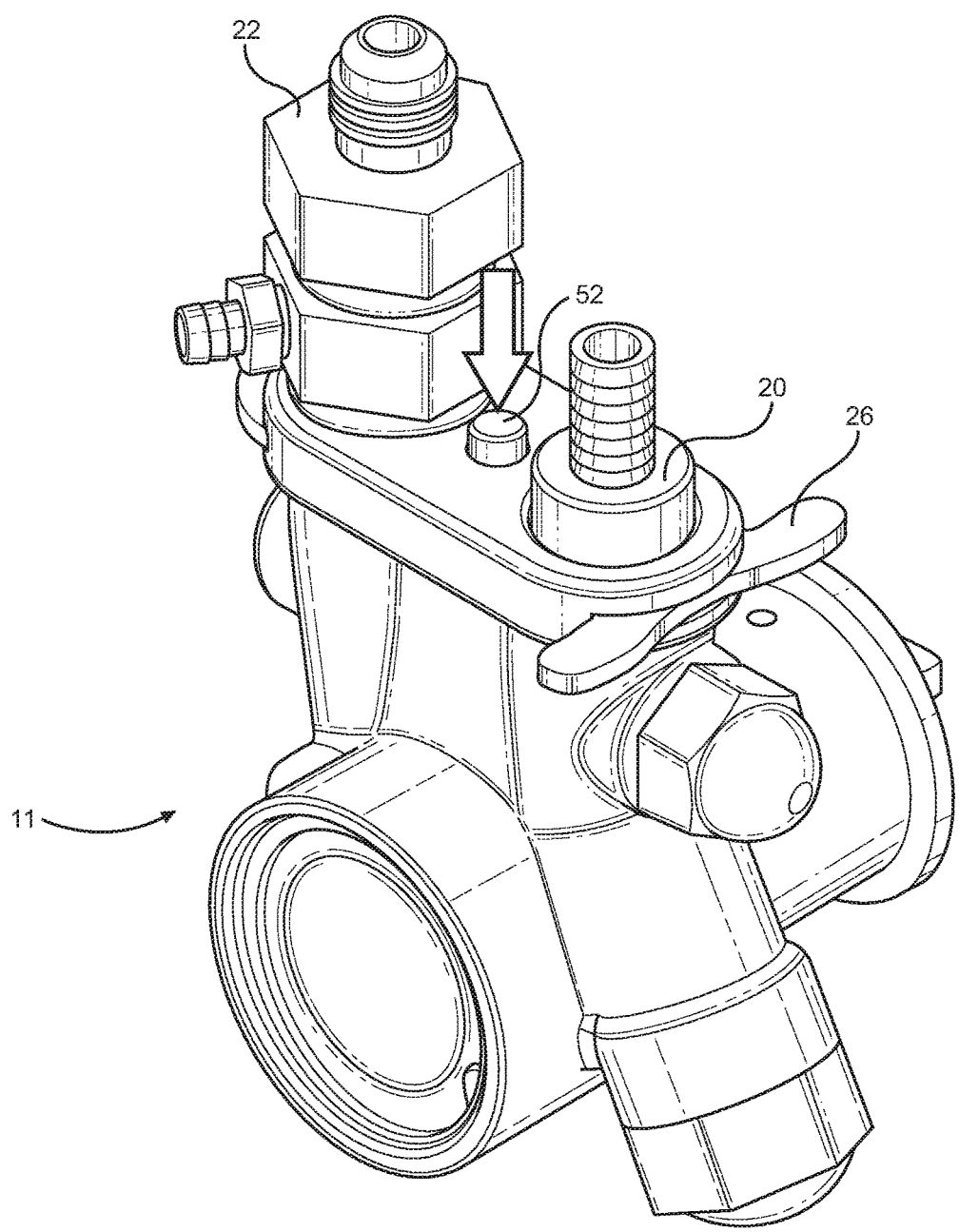
Figure 3B:
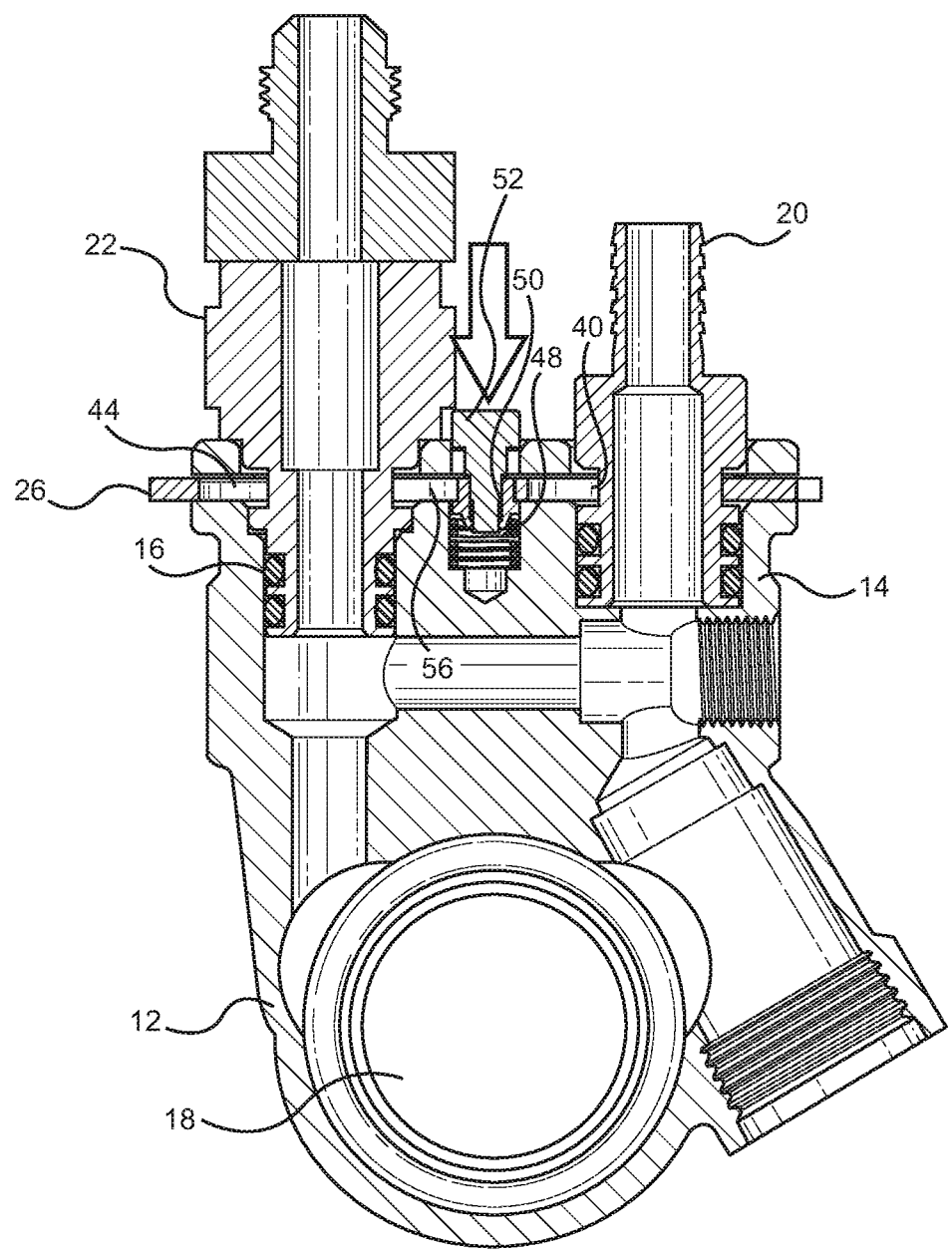

The initial condition of the pump assembly 10 with the first and second removable fittings 20, 22 installed is shown in FIGS. 3A & 3B. With the sliding lock member 26 in the locked position, the narrower first opening portion 38 of the inlet port opening 32 engages a notch formed in the first removable fitting 20 in order to retain the first pump fitting within the inlet port passage 14. At the same time, the narrower first opening portion 42 of the outlet port opening 34 engages a notch formed in the second removable pump fitting 22 in order to retain the second pump fitting 22 within the outlet port passage 16. Also in this locked position, the retainer base 50 passes through the wider first opening portion 54 of the sliding lock retainer opening 36. Because the retainer base 50 is wider than the second opening portion 56 of the sliding lock retainer opening 36, however, the sliding lock member 26 is prevented from moving from the locked position to the unlocked position.

Figure 4A:
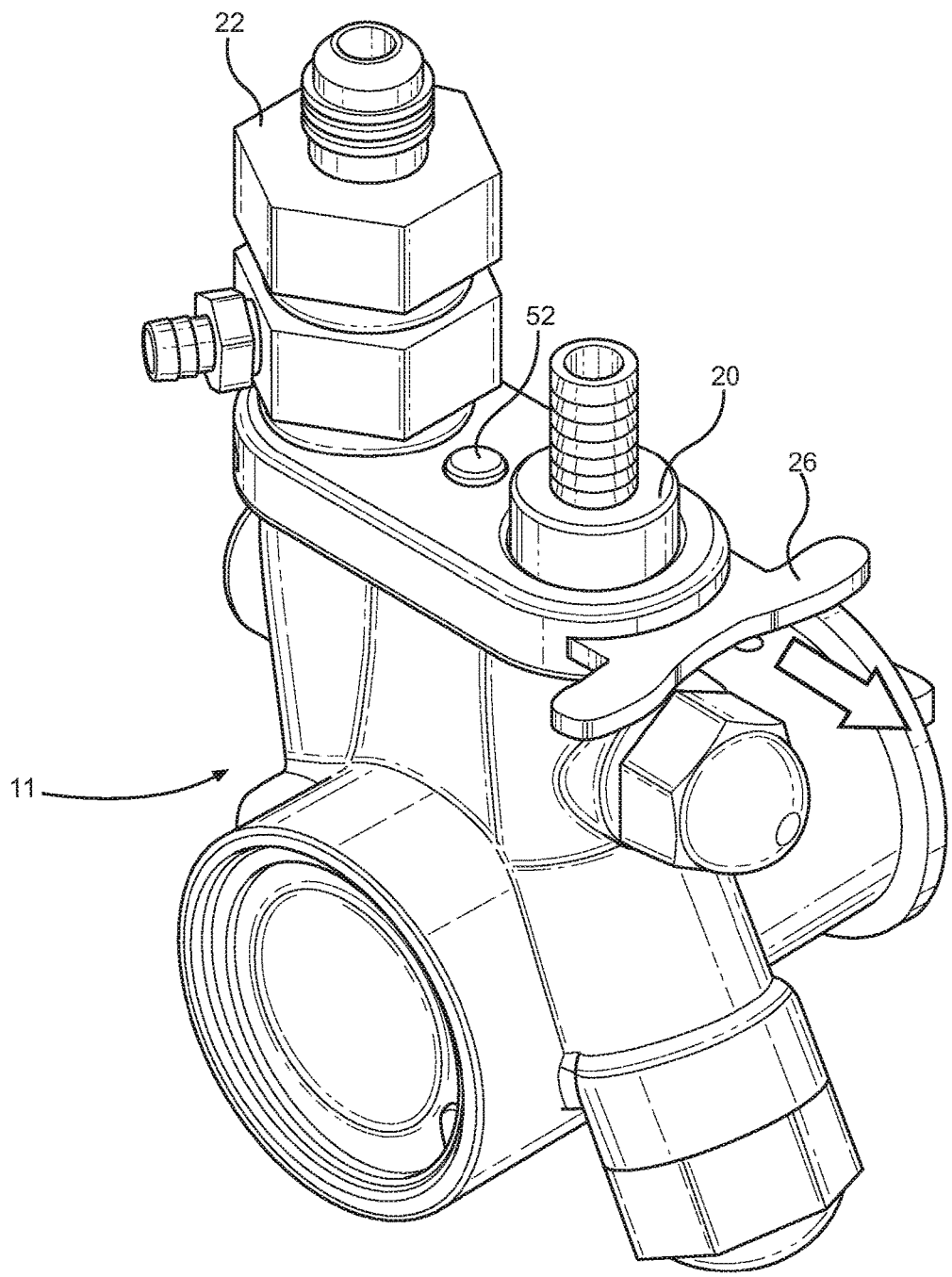
Figure 4B:
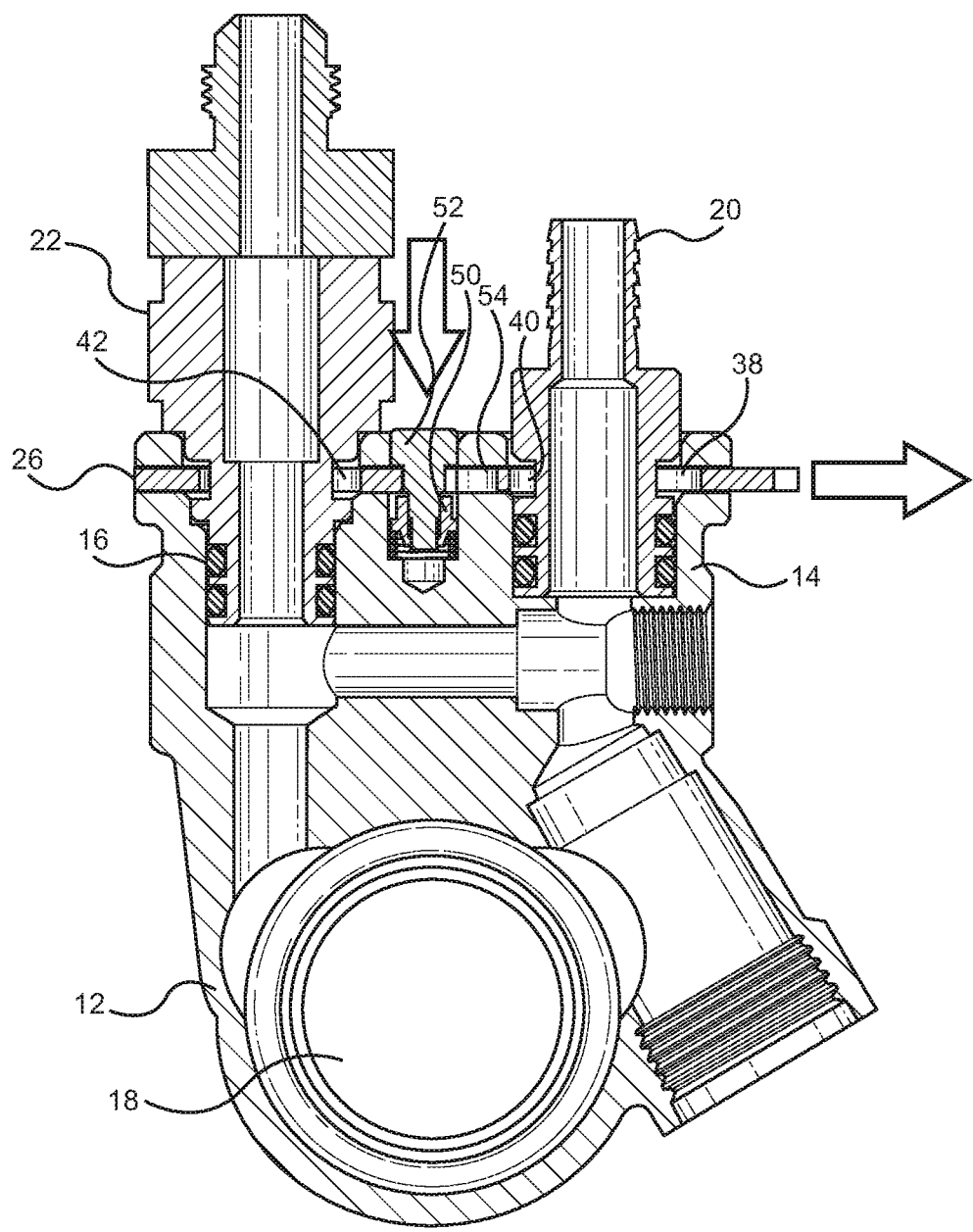

In order to disconnect the first and second removable fittings 20, 22, the retainer button 52 is initially depressed, so that the retainer base 50 is pushed below the sliding lock retainer opening 36 and the smaller retainer button 52 is instead positioned within the sliding lock retainer opening 36. Because the retainer button 52 is smaller than the second opening portion 56 of the sliding lock retainer opening 36, the sliding lock member 26 may then be moved from the locked position to the unlocked position, as shown in FIGS. 4A & 4B.

Figure 5A:
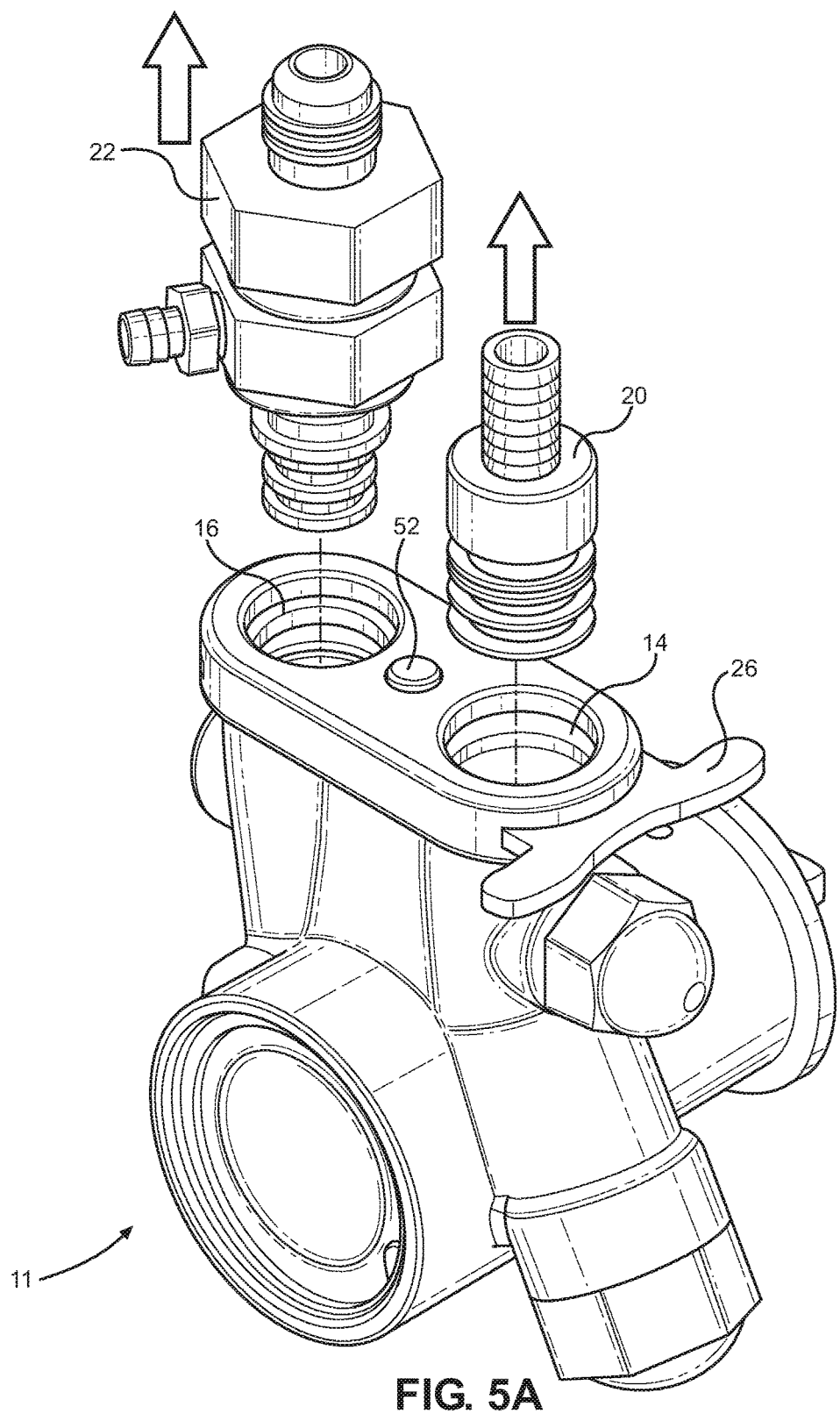
Figure 5B:
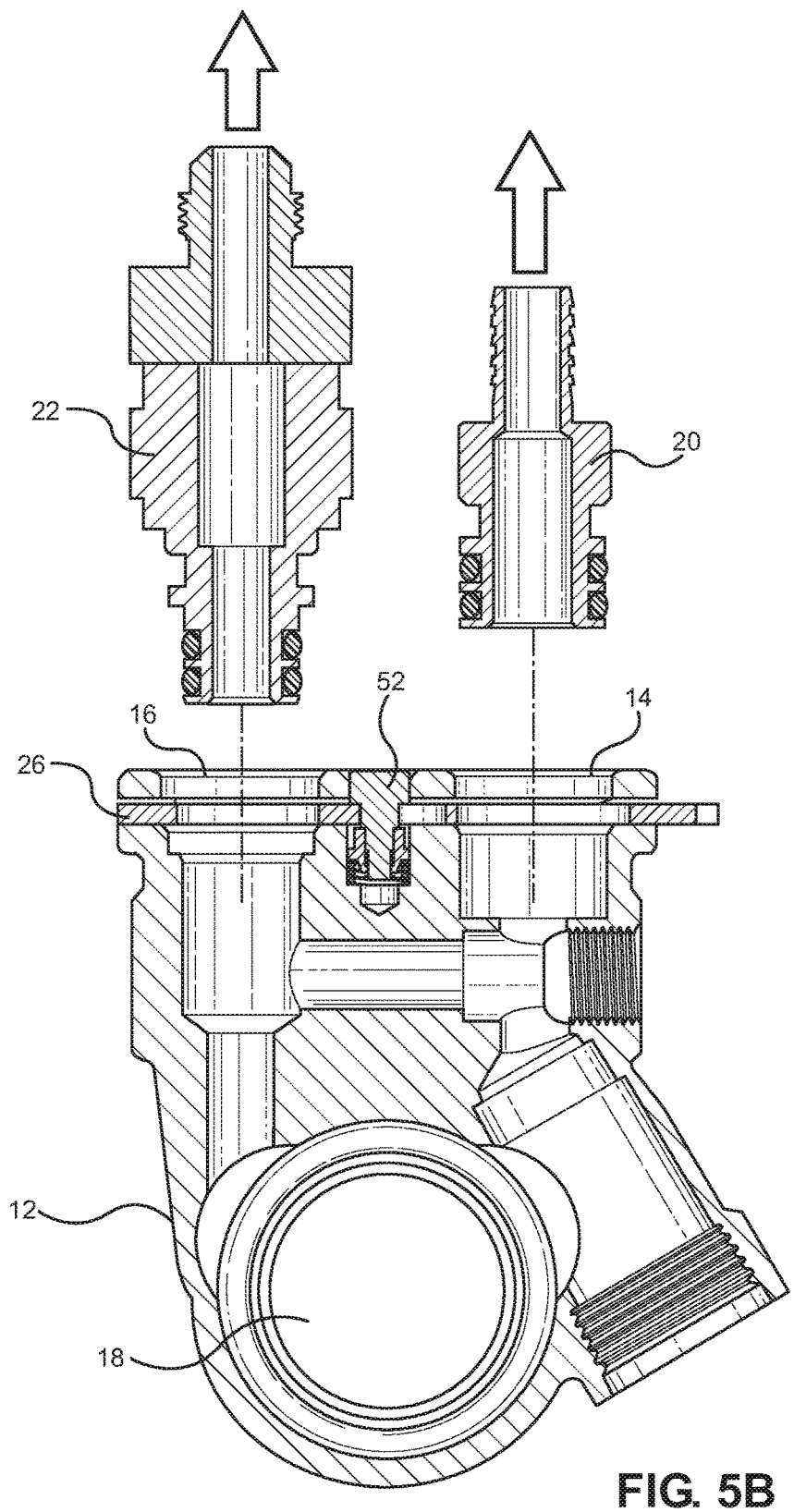

As the sliding lock member 26 is moved from the locked to the unlocked position, the narrower, first opening portions 38, 42 of the inlet and outlet port openings 32, 34 disengage from the first and second removable fittings 20, 22. When the sliding lock member 26 is fully moved to the unlocked position, the first and second removable fittings 20, 22 are then disposed within the wider, second opening portions 40, 44 of the inlet and outlet port openings 32, 34. These second opening portions 40, 44 do not engage or retain the removable fittings 20, 22. The first and second removable pump fittings 20, 22 may then be removed from the respective inlet and outlet port openings 32, 34, as shown in FIGS. 5A & 5B.

Quick reconnection of the pump assembly 10 to the water supply and discharge lines is achieved by substantially carrying out this process in reverse order.

Advantageously, both connections and disconnections are preferably carried out without the need for any tools according to the present disclosure.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A quick disconnect pump assembly comprising:
a pump housing having an inlet port passage and an outlet port passage, an elongate slot for receiving a sliding lock member, and a retainer channel disposed between the inlet port passage and an outlet port passage;
a sliding lock member received within the elongate slot and movable within the slot between a locked position and an unlocked position, the sliding lock member having an inlet port opening, an outlet port opening, and a sliding lock retainer opening,
wherein the inlet port opening and the outlet port opening each have a first, narrower opening portion which engages and retains a removable fitting when the sliding lock member is in the locked position and a second, wider opening portion which does not engage or retain the removable fitting when the sliding lock member is in the unlocked position; and
a sliding lock retainer disposed within the retainer channel and passing through the sliding lock retainer opening to prevent removal of the sliding lock member from the elongate slot.

2. The quick disconnect pump assembly of claim 1, wherein the sliding lock retainer comprises a spring disposed within the retainer channel, a retainer base disposed adjacent the spring within the retainer channel and biased upward by the spring, and a retainer button which passes through the sliding lock retainer opening and is attached to the retainer base.

3. The quick disconnect pump assembly of claim 2, wherein the sliding lock retainer opening has a first, wider opening portion which engages the sliding lock retainer base when the sliding lock member is in the locked position and a second, narrower opening which engages and sliding lock retainer button when the sliding lock member in the unlocked position.

4. The quick disconnect pump assembly of claim 1, wherein the inlet port passage has a first cross-sectional area and the outlet port passage has a second cross-sectional area which is different from the first cross-sectional area.

5. The quick disconnect pump assembly of claim 1, wherein the inlet port passage has a first cross-sectional diameter and the outlet port passage has a second cross-sectional diameter which is different from the first cross-sectional diameter.

6. The quick disconnect pump assembly of claim 1, wherein the sliding lock member further comprises at least one handle portion.

7. A quick disconnect fluid pump comprising:
a pump housing having an internal pumping chamber, an inlet port passage in flow communication with the pumping chamber, an outlet port passage in flow communication with the pumping chamber, an elongate slot for receiving a sliding lock member, and a retainer channel disposed between the inlet port passage and an outlet port passage;
a pumping mechanism at least partially disposed within the pumping chamber and capable of receiving a fluid through the inlet port passage into the pumping chamber at a first pressure and discharging the fluid from the pumping chamber through the outlet port passage at a second pressure which is greater than the first pressure;
a sliding lock member received within the elongate slot and movable within the slot between a locked position and an unlocked position, the sliding lock member having an inlet port opening, an outlet port opening, and a sliding lock retainer opening,
wherein the inlet port opening and the outlet port opening each have a first, narrower opening portion which engages and retains a removable fitting when the sliding lock member is in the locked position and a second, wider opening portion which does not engage or retain the removable fitting when the sliding lock member is in the unlocked position; and
a sliding lock retainer disposed within the retainer channel and passing through the sliding lock retainer opening to prevent removal of the sliding lock member from the elongate slot.

8. The quick disconnect fluid pump of claim 7, wherein the sliding lock retainer comprises a spring disposed within the retainer channel, a retainer base disposed adjacent the spring within the retainer channel and biased upward by the spring, and a retainer button which passes through the sliding lock retainer opening and is attached to the retainer base.

9. The quick disconnect fluid pump of claim 8, wherein the sliding lock retainer opening has a first, wider opening portion which engages the sliding lock retainer base when the sliding lock member is in the locked position and a second, narrower opening which engages and sliding lock retainer button when the sliding lock member in in the unlocked position.

10. The quick disconnect fluid pump of claim 7, wherein the inlet port passage has a first cross-sectional area and the outlet port passage has a second cross-sectional area which is different from the first cross-sectional area.

11. The quick disconnect fluid pump of claim 7, wherein the inlet port passage has a first cross-sectional diameter and the outlet port passage has a second cross-sectional diameter which is different from the first cross-sectional diameter.

12. The quick disconnect fluid pump of claim 7, wherein the sliding lock member further comprises at least one handle portion.

13. A water carbonation system comprising;
a source of compressed carbon dioxide gas;
a source of non-carbonated water in flow communication with a first removable pump fitting;
a carbonation mixing tank in flow communication with the source of compressed carbon dioxide gas and in flow communication with a second removable pump fitting, wherein carbon dioxide gas is mixed with, and dissolved into, the water in the mixing tank to provide carbonated water; and
a quick disconnect fluid pump for pumping water into the carbonation mixing tank, the pump comprising:
a pump housing having an internal pumping chamber, an inlet port passage in flow communication with the pumping chamber, an outlet port passage in flow communication with the pumping chamber, an elongate slot for receiving a sliding lock member, and a retainer channel disposed between the inlet port passage and an outlet port passage;
a pumping mechanism at least partially disposed within the pumping chamber and capable of receiving a fluid through the inlet port passage into the pumping chamber at a first pressure and discharging the fluid from the pumping chamber through the outlet port passage at a second pressure which is greater than the first pressure;
a sliding lock member received within the elongate slot and movable within the slot between a locked position and an unlocked position, the sliding lock member having an inlet port opening, an outlet port opening, and a sliding lock retainer opening,
wherein the inlet port opening has a first, narrower opening portion which engages and retains the first removable pump fitting when the sliding lock member is in the locked position and a second, wider opening portion which does not engage or retain the first removable pump fitting when the sliding lock member is in the unlocked position;
wherein the outlet port opening has a first, narrower opening portion which engages and retains the second removable pump fitting when the sliding lock member is in the locked position and a second, wider opening portion which does not engage or retain the second removable pump fitting when the sliding lock member is in the unlocked position; and
a sliding lock retainer disposed within the retainer channel and passing through the sliding lock retainer opening to prevent removal of the sliding lock member from the elongate slot.

14. The water carbonation system of claim 13, wherein the sliding lock retainer comprises a spring disposed within the retainer channel, a retainer base disposed adjacent the spring within the retainer channel and biased upward by the spring, and a retainer button which passes through the sliding lock retainer opening and is attached to the retainer base.

15. The water carbonation system of claim 14, wherein the sliding lock retainer opening has a first, wider opening portion which engages the sliding lock retainer base when the sliding lock member is in the locked position and a second, narrower opening which engages and sliding lock retainer button when the sliding lock member in in the unlocked position.

16. The water carbonation system of claim 7, wherein the inlet port passage has a first cross-sectional area and the outlet port passage has a second cross-sectional area which is different from the first cross-sectional area.

17. The water carbonation system of claim 7, wherein the inlet port passage has a first cross-sectional diameter and the outlet port passage has a second cross-sectional diameter which is different from the first cross-sectional diameter.

18. The water carbonation system of claim 7, wherein the sliding lock member further comprises at least one handle portion.

* * * * *